Sept. 11, 1923. 1,467,847
C. FULTON
INDICATING MECHANISM
Filed Feb. 14, 1923 3 Sheets-Sheet 1

Sept. 11, 1923.   1,467,847
C. FULTON
INDICATING MECHANISM
Filed Feb. 14, 1923   3 Sheets-Sheet 2

Inventor.

Sept. 11, 1923.
C. FULTON
1,467,847
INDICATING MECHANISM
Filed Feb. 14, 1923
3 Sheets-Sheet 3
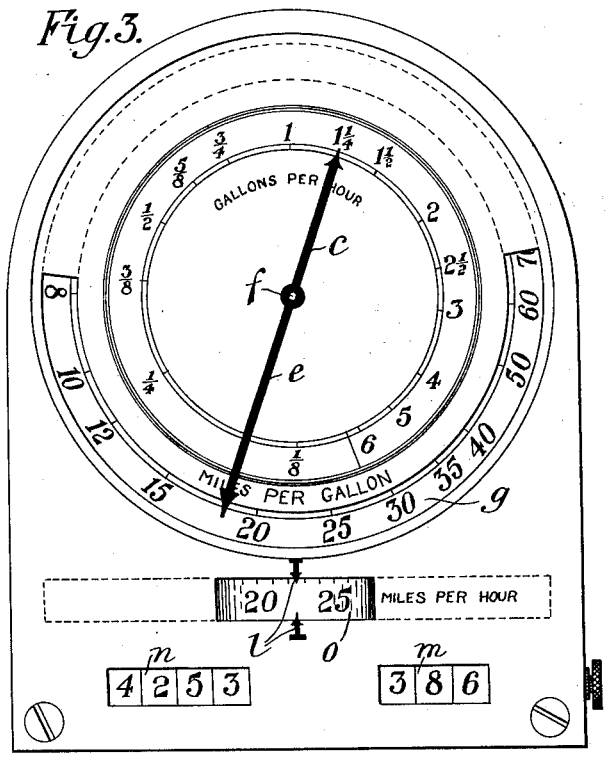
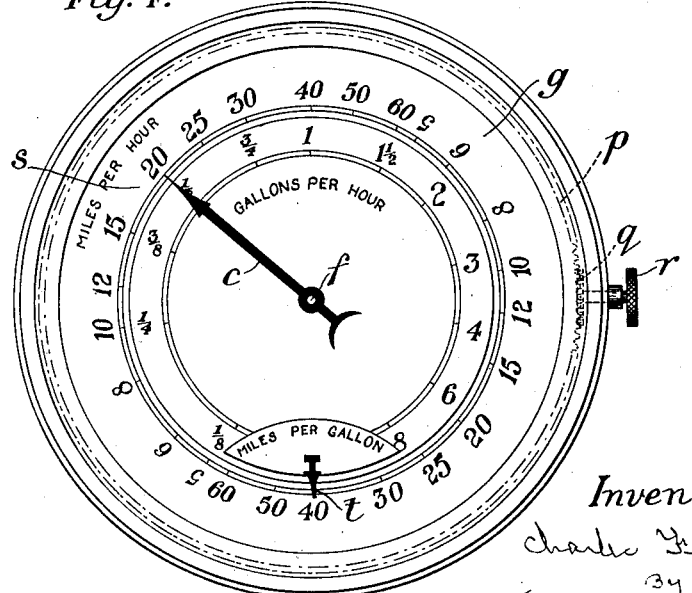
Inventor.
Charles Fulton
By
George K. Prescott Atty.

Patented Sept. 11, 1923.

1,467,847

UNITED STATES PATENT OFFICE.

CHARLES FULTON, OF LONDON, ENGLAND.

INDICATING MECHANISM.

Application filed February 14, 1923. Serial No. 618,968.

*To all whom it may concern:*

Be it known that I, CHARLES FULTON, a subject of the King of Great Britain, residing at 100 Iverna Court, Kensington, London, England, have invented a new and useful Indicating Mechanism, of which the following is a specification.

This invention relates to devices of the kind designed for use in motor vehicle propelled by internal combustion engines for indicating the distance run by the vehicle per unit of quantity of liquid fuel used whilst running at any speed, for instance, in miles per gallon, thus avoiding the necessity for mental or other calculations which are required when using a flow meter and speedometer separately as some times arranged.

According to the invention I employ a flow meter which indicates by means of a pointer working over a dial the rate of flow in gallons per hour of the liquid fuel as used by the engine and I employ a speedometer, the pointer of which works over a dial to indicate miles per hour run by the vehicle. I also provide an additional pointer on the arbor of the pointer of the flow meter and a circular scale concentric with but loose with respect to the said arbor over which scale the additional pointer works, the scale being graduated so that the said pointer indicates miles per gallon. This loose circular scale is geared to the arbor of the pointer of the speedometer, and the said circular scale and the scales of the flow meter and speedometer are so calibrated or graduated that the additional pointer of the flow meter will indicate at all times the number of miles that the vehicle is running to each gallon of fuel being used, at the same time the flow meter and speedometer will function as usual to indicate respectively gallons per hour of fuel used and miles per hour run by the vehicle.

In a suitable arrangement for carrying out the invention I employ a flowmeter and speedometer in which the scales are graduated in geometrical progression and the additional pointer is formed as an extension of the flow meter pointer and a pair of gear-wheels of equal diameter are employed, one to carry the loose circular scale and the other being keyed to the arbor of the speedometer, the movement of the latter being imparted to the former by an intermediate gear-wheel. The loose scale is advantageously disclosed through a slot in the dial of the flow meter.

In a modification, instead of operating the loose circular scale by gearing from the arbor of the pointer of the speedometer as above described, I arrange the speedometer behind the flow meter so that their arbors are in axial alignment and with the said loose circular scale attached to the arbor of the speedometer so as to be rotated thereby, the usual pointer of the speedometer being dispensed with. The graduations on the said scale, in addition to serving for indicating miles run per gallon of fuel used, will also serve by the aid of a fixed pointer to indicate miles run per hour. Or, the said scale can be enlarged and be provided with a second set of graduations for the purpose of working in conjunction with the fixed pointer.

It is to be understood that the loose disc may be actuated by hand instead of by the speedometer the said disc being provided with an additional scale of miles per hour which works in conjunction with the flow meter pointer, the scale of miles per gallon on the loose disc working in conjunction with a fixed pointer or indicator on the dial of the flow meter.

To enable the invention to be fully understood I will describe it by reference to the accompanying drawing, in which:—

Figures 2 and 3 are front views of modified forms of the device.

Figure 4 is a front view of the device designed to be actuated by hand.

Figure 1:
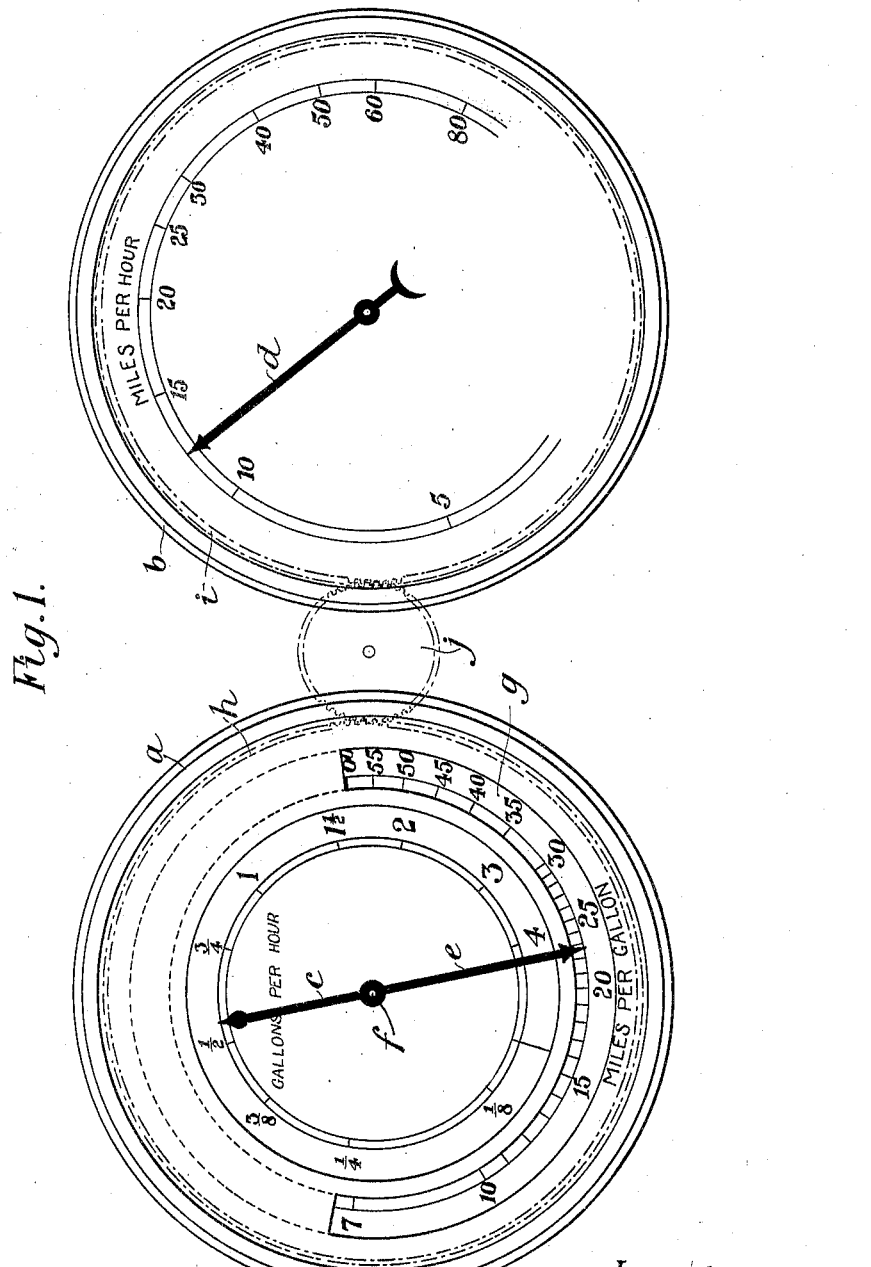
Figure 1 is a front view of a device constructed in accordance with the invention for use on a motor vehicle propelled by an internal combustion engine for indicating the distance run by the vehicle per unit of quantity of liquid fuel used by the engine.

Referring to Figure 1, $a$ is the flow meter arranged in connection with the petrol supply pipe of the engine and $b$ is the speedometer driven from one of the vehicle wheels in the usual way. The flow meter and speedometer are preferably of the kind provided respectively, with pointers $c$, $d$ working over graduated dials as indicated, the scales thereof having the divisions thereof spaced apart in geometrical progression also as indicated, the said instrument $a$ and $b$ being calibrated to indicate gallons per hour and miles per hour, respectively.

$e$ is the additional pointer on the arbor $f$ of the pointer $c$ the said pointer $e$ being shown as an extension of the said pointer $c$ and $g$ is the circular scale concentric with, but loose with respect to, the said arbor, the divisions of which scale are also spaced apart in geometrical progression and disclosed through a circular slot in the enlarged dial of the flow meter $a$. $h$, $i$ are the two gear-wheels of equal diameter, the wheel $h$ carrying the loose circular scale $g$, whilst the wheel $i$ is keyed to the arbor of the pointer $d$ of the speedometer $b$. $j$ is the intermediate gear-wheel for transmitting movement from the wheel $i$ to the wheel $h$.

By the described arrangement it will be seen that angular movements corresponding to those of the pointer $d$ will be imparted to the loose circular scale $g$ which will work under the point of the pointer $e$ the latter partaking of the movements of the pointer $c$ and indicating on the said loose scale the distance run by the vehicle per unit of quantity of the fuel in miles per gallon.

Figure 2:
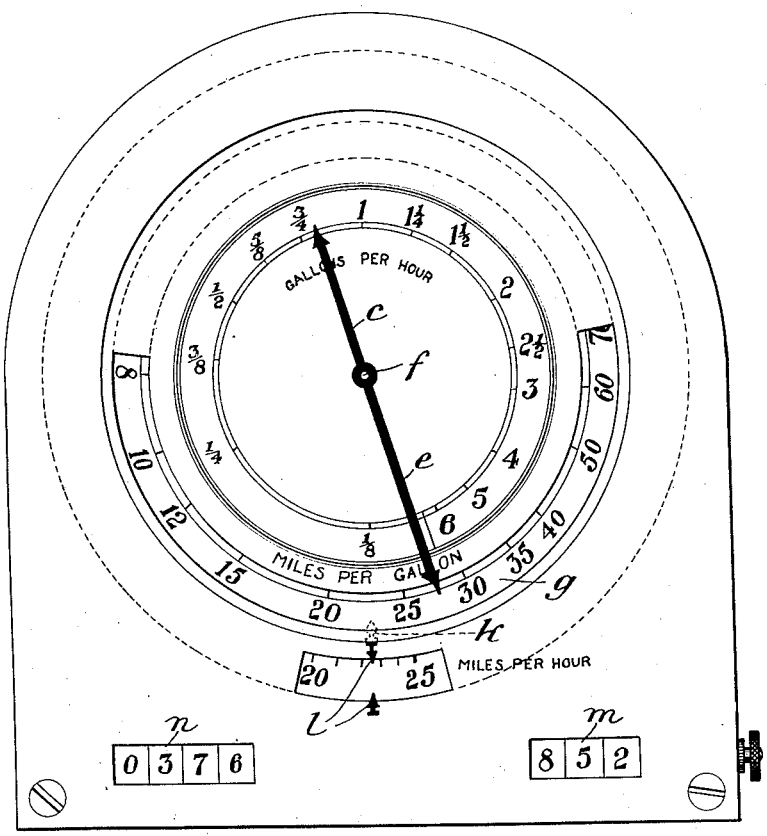

Figure 2 illustrates the form of the apparatus where the speedometer is arranged behind the flow meter so that their arbors are in axial alignment, the circular scale $g$ being attached or keyed to the arbor of the speedometer so as to be directly rotated thereby, the speedometer pointer being dispensed with. As shown, the graduations on the said scale, in addition to indicating by means of the pointer $e$ miles run per gallon of fuel used, also serve to indicate miles run per hour, a fixed pointer $k$, indicated by dotted lines, projecting over the scale for this purpose. Or, the disc of the scale $g$ can be enlarged as indicated and be provided with a second set of graduations working in conjunction with fixed pointers $l$.

$m$, $n$ are two counters in connection with the speedometer mechanism for indicating in the known manner the mileage of any one trip and the total mileage of a series of trips.

Figure 3 illustrates a slightly modified form of the instrument illustrated in Figure 2, wherein, instead of increasing the diameter of the disc of the scale $g$, an independent wheel $o$ is arranged at right angles to the said disc and driven from the arbor of the speedometer by suitable gearing at equal speed with the said arbor, the said wheel $o$ having its edges graduated and working in conjunction with the pointers $l$.

Figure 4 illustrates the arrangement where the disc of the loose scale $g$ is designed to be actuated by hand instead of by the speedometer, the mode illustrated being by means of a wheel $p$ carrying the scale and pinion $q$ in mesh therewith and actuated by a milled knob $r$.

This disc is provided with an additional scale of miles per hour as indicated at $s$ which works in conjunction with the pointer $c$ of the flow meter whilst the scale of miles per gallon on the scale $g$ works in conjunction with a fixed pointer $t$.

In using the last described apparatus the user will operate the knob $r$ to rotate the disc $g$ so that the pointer $c$ indicates the number of miles per hour on the scale to agree with the reading of the speedometer of the vehicle, the rotation of the said disc moving the scale thereof under the pointer $t$ which indicates the miles run per gallon.

The device shown in the drawings may be used in connection with a flow-meter of the type shown in the patent to Bowden No. 1,181,566, May 2, 1916, if my flow-meter dial is used in place of the dial of said patent.

Claims:

1. A device for indicating the distance covered by a motor vehicle per unit of quantity of liquid fuel used by the internal combustion engine thereof, comprising a stationary dial calibrated to indicate the quantity of liquid fuel used per hour, a pointer actuated by a flow-meter mechanism and co-operating with said dial, a movable scale arranged adjacent to said dial and calibrated to indicate the distance travelled per gallon of fuel, a second pointer actuated in unison with the first mentioned pointer and co-operating with the movable scale, and means for shifting said scale relatively to second pointer.

2. A device as claimed in claim 1, combined with a speedometer, the means for shifting said scale relatively to said second pointer, being driven by said speedometer.

CHARLES FULTON.